United States Patent [19]

Glinski

[11] Patent Number: 4,783,809
[45] Date of Patent: Nov. 8, 1988

[54] AUTOMATIC SPEECH RECOGNIZER FOR REAL TIME OPERATION

[75] Inventor: Stephen C. Glinski, Piscataway, N.J.

[73] Assignee: American Telephone and Telegraph Company, AT&T Bell Laboratories, Murray Hill, N.J.

[21] Appl. No.: 669,246

[22] Filed: Nov. 7, 1984

[51] Int. Cl.$^4$ ............................................. G10L 5/06
[52] U.S. Cl. .................................................... 381/43
[58] Field of Search ........................... 381/42, 43, 41; 364/513.5

[56] References Cited

U.S. PATENT DOCUMENTS

| | | | |
|---|---|---|---|
| 4,049,913 | 11/1976 | Sakoe | 381/43 |
| 4,059,725 | 12/1976 | Sakoe | 381/43 |
| 4,156,868 | 5/1979 | Levinson | 381/43 |
| 4,400,788 | 8/1983 | Myers et al. | 381/43 |

OTHER PUBLICATIONS

Bridle, Brown and Chamberlain, "An Algorithm for Connected Word Recognition", *Proceedings of Intn'l. Conf. on Acoustics, Speech and Signal Processing*, 1982, pp. 899-902.

*Bell System Technical Journal*, vol 60, No. 7, Part 2, Sep. 1981.

Stephen Morse, *The 8086-8088 Primer*, 2nd Edition, 1980.

Primary Examiner—Emanuel S. Kemeny
Assistant Examiner—David D. Knepper
Attorney, Agent, or Firm—Jack S. Cubert

[57] ABSTRACT

A speech recognizer identifies an unknown utterance as a variable length string of stored reference patterns in a single pass through the time frame sequence of utterance feature signals. A plurality of reference pattern levels are used to permit strings of varying lengths. As each utterance time frame portion is received, its acoustic feature signals are time registered with the reference pattern feature signals at each reference pattern level to form reference pattern endframe registration path and registration path correspondence signals. Responsive to the plurality of level reference pattern end frame registration path signals, reference pattern strings are selected for the current utterance frame. The utterance is identified as the selected reference string with the best correspondence to the utterance from the registration path signals of the reference levels of the last utterance time frame.

6 Claims, 6 Drawing Sheets

| REFERENCE NO. t | REFERENCE FRAME i | |
|---|---|---|
| 1 | $R_{11}$  $R_{12}$ ------ $R_{1i}$ ----- $R_{1I1}$ | $I_1$ |
| 2 | $R_{21}$  $R_{22}$ ------ $R_{2i}$ ----- $R_{2I2}$ | $I_2$ |
| t | $R_{t1}$  $R_{t2}$ ---- $R_{ti}$ ----- $R_{tIt}$ | $I_t$ |
| V | $R_{V1}$  $R_{V2}$ --- $R_{Vi}$ ---- $R_{VIV}$ | $I_V$ |

AUTOMATIC SPEECH RECOGNIZER FOR REAL TIME OPERATION

BACKGROUND OF THE INVENTION

My invention relates to pattern recognition and more particularly to arrangements for automatically recognizing speech patterns.

Speech recognition systems used in communication, data processing and control systems generally compare the acoustic features of an input speech pattern with previously stored acoustic features of identified reference patterns. The input pattern is recognized when its acoustic features match the stored features of a reference pattern according to predetermined recognition criteria. The variability of speech patterns from speaker to speaker, however, limits recognition accuracy and makes it highly dependent on the selected acoustic features and recognition criteria. Best results are obtained when the reference features and the input speech features are derived from the same individual and the patterns are spoken with distinct pauses between words.

Identification of single word patterns may be accomplished by comparing the word pattern to each of a set of reference word patterns. A multiword pattern must be recognized as one of many combinations of reference vocabulary words. Consequently, automatic recognition of such multiword patterns is more difficult than automatic recognition of single word patterns. Such recognition of multiword speech patterns may be performed by comparing the sequence of input speech features with every possible combination of reference word feature signal patterns. This method, however, requires time-consuming testing of all possible reference word pattern combinations and exhaustive searching for the best matching combination. But, as is well known, the number of possible combinations increases exponentially with the number of words in a speech pattern. As a result, it is generally impractical to perform the testing and searching even for a speech pattern of a limited number of words.

U.S. Pat. Nos. 4,049,913 and 4,059,725 disclose speech recognition systems in which the similarity between individual reference word feature patterns and the features of all possible intervals of an input speech pattern are calculated. Partial recognition results are derived for each reference word feature pattern from the similarity measures. Both the partial similarity measures and partial recognition results are stored in a table. The recognized results are extracted from the table to provide the reference word series corresponding to the speech pattern. All possible partial pattern combinations from the table are selected and the selected pattern with maximum similarity is chosen. Since all possible partial pattern combinations are required, the signal processing is highly complex and uneconomical for many applications.

The number of possible reference sequences in recognition processing may be reduced by utilizing semantic and syntactic restrictions. U.S. Pat. No. 4,156,868 issued to S. E. Levinson, May 29, 1979, discloses a recognition arrangement based on syntactic analysis in which an input speech pattern is compared to only syntactically possible reference patterns. The syntactic restrictions significantly reduce the recognition processing. There are, however, many situations where the recognition of sequences of unrelated spoken words such as a series of spoken digits in credit card or telephone numbers is important. For such unrestricted vocabularies, recognition is not improved by resorting to syntactic or other semantic restraints.

U.S. Pat. No. 4,400,788, issued Aug. 28, 1983 to C. S. Myers et al and assigned to the same assignee, discloses a dynamic time warping recognition arrangement in which a set of word levels is defined for the input speech pattern and the successive segments of the input speech pattern are assigned to each word level. At each successive level, the assigned segment feature signals and the feature signals of each reference word are time registered to generate time registration endframe and time registration similarity signals for the reference words in the level. Reference word strings are selected responsive to the time registration endframe and similarity signals by backtracking through the recorded time registration paths. While the arrangement obviates the need to consider all possible reference word combinations in recognition processing, it is necessary to first store the entire input speech pattern feature signal sequence and to repeatedly sequence through speech pattern feature signal frames. The multiple passes through the input speech pattern time frames, extends the recognition processing and makes "real time" speech recognition difficult to achieve.

The article "An Algorithm for Connected Word Recognition", by Bridle, Brown and Chamberlain, appearing in the *Proceedings of International Conference on Acoustics, Speech and Signal Processing*, 1982, pp. 899–902, discloses a dynamic time warping recognition method in which time registration paths are formed for all reference words in a single pass through the input speech pattern frames. The single pass is performed as the feature signals are generated for the sequence of input speech pattern frames. Consequently, real time operation is more easily realizable. If, however, two different registration paths representing different length word strings converge during the single pass, only one registration path can be retained. The other converging path is discarded from consideration. But the other converging path could result in a better match by the end of the registration process. The elimination of such potential candidates lowers the accuracy of the recognition arrangement.

It is an object of the invention to provide improved automatic speech recognition having higher accuracy and real time response.

BRIEF SUMMARY OF THE INVENTION

The foregoing object is achieved by assigning a plurality of reference word levels to each input speech pattern frame. In this way, the input speech reference pattern registration paths formed during the single pass through the speech pattern frames are retained for evaluation and convergence of time registration paths is prevented.

The invention is directed to a speech recognizer in which an unknown speech pattern is analyzed to produce acoustic feature signals representative of the pattern. The acoustic features of the unknown speech pattern are compared to acoustic feature signals of reference patterns to form strings of identified reference patterns. The speech pattern is recognized as the reference pattern string having the closest matching acoustic features. Reference pattern string generation includes producing a set of signals identifying successive reference pattern levels and generating a sequence of signals corresponding to the succession of utterance time frames. The acoustic feature signals of the utterance frames are time registered with the acoustic feature signals of the reference patterns for each level in a single pass through said succession of utterance time frames to produce time registration path signals and time registration path correspondence signals for the endframes of the reference patterns. Reference word strings are selected responsive to the time registration path endframe and time registration correspondence signals of the levels.

GENERAL DESCRIPTION

Figure 1:
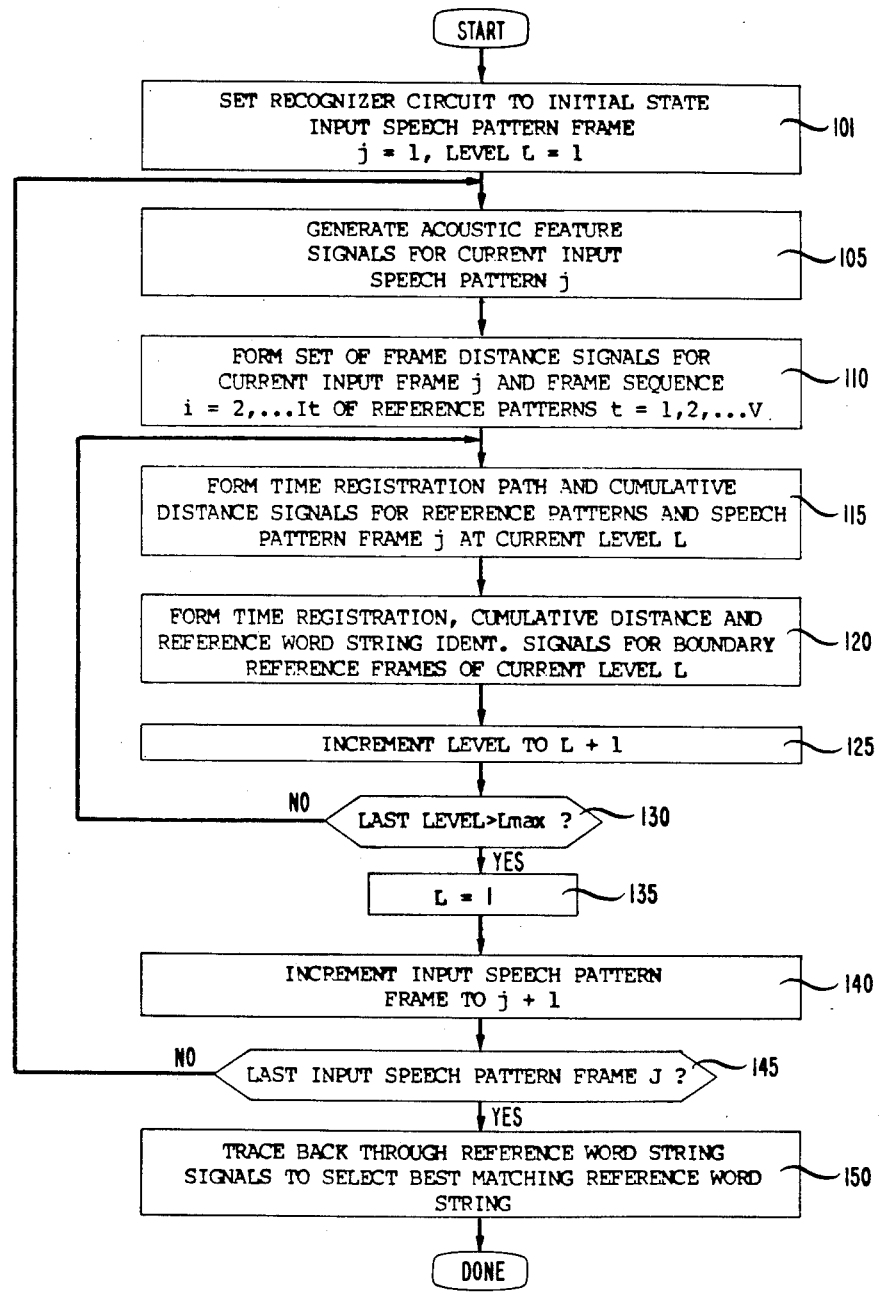
FIG. 1 is a general flow chart depicting a speech recognition arrangement illustrative of the invention.

In the recognition of continuous speech such as connected word patterns, a time sequence of acoustic feature signals $$R^t = R^t(1), R^t(2), \ldots R^t(i), \ldots R^t(It) \quad (1)$$

is stored for each of a set of reference words. The features may be derived from spectral, predictive or other type of acoustic analysis of utterances of each reference word $R^t$, $1 <= t <= V$ of a predetermined vocabulary. A time sequence of acoustic feature signals $$T = T(1), T(2), \ldots T(j), \ldots T(J) \quad (2)$$

is derived from the same type of analysis of an unknown speech pattern. All possible strings of reference words may be synthesized and the sequence of feature signals for each string may be compared to the input utterance feature signal sequence. The closest matching string can then be identified as the unknown input utterance. Since the rate of speech and articulation vary widely, the well-known technique of dynamic time warping may be employed to time register the reference word string features to the input utterance features. In this way, a more accurate measure of the correspondence between the reference word strings and the input utterance can be obtained.

Each reference word string is a concatenation of reference words $$R^s = R^{t1} + R^{t2} + \ldots + R^{tf} \quad (3)$$

The acoustic feature signals of string $R_s$ are dynamically time warped to the feature signals of the utterance to generate the minimum DTW distance signal between the reference word string feature vector $$R^s = R^{t1}(1), R^{t1}(2), \ldots, R^{t1}(It1), R^{t2}(1), R^{t2}(2), \ldots, R^{t2}(It2), R^{tf}(1), R^{tf}(2), \ldots R^{tf}(Itf) \quad (4)$$

and the utterance feature vector $$T = T(1), T(2), \ldots, T(j), \ldots T(J) \quad (5)$$

The cumulative distance signal obtained by time warping the feature Vector sequence of string $R^s$ to utterance feature vector sequence is $$D(T, R^s) = \min_{w(j)} \sum_{j=1}^{J} d(T(j), R^s(w(j))) \quad (6)$$

where w(n) is the warping factor between feature vectors T and $R^s$ and $$d(T(j), R^s(w(j))) = \min \left[ \sum_{p=1}^{P} T_p(j) R_p^s(w(j)) - 1, CL \right] \quad (7)$$

is the local frame distance between the feature vectors of frame j of utterance T and frame $i = w(j)$ of string $R^s$, p is the component of the vectors, and CL is a constant. The direct application of all possible strings $R^s$ results in uneconomic and time-consuming signal processing for even a modest number of reference words in a string.

A considerable reduction in feature signal processing is attained by partitioning the dynamic time warping into levels as described in U.S. Pat. No. 4,400,788 and repeatedly processing through the feature signal sequence of the unknown utterance to obtain reference word string candidates. According to the invention, the advantages of multilevel processing are achieved in a single pass through the feature signal sequence of the unknown speech pattern. Advantageously, the single pass through the speech pattern frame sequence speeds up recognition so that real time operation can be readily achieved while multilevel processing provides improved accuracy in the single pass arrangement.

Figure 2:
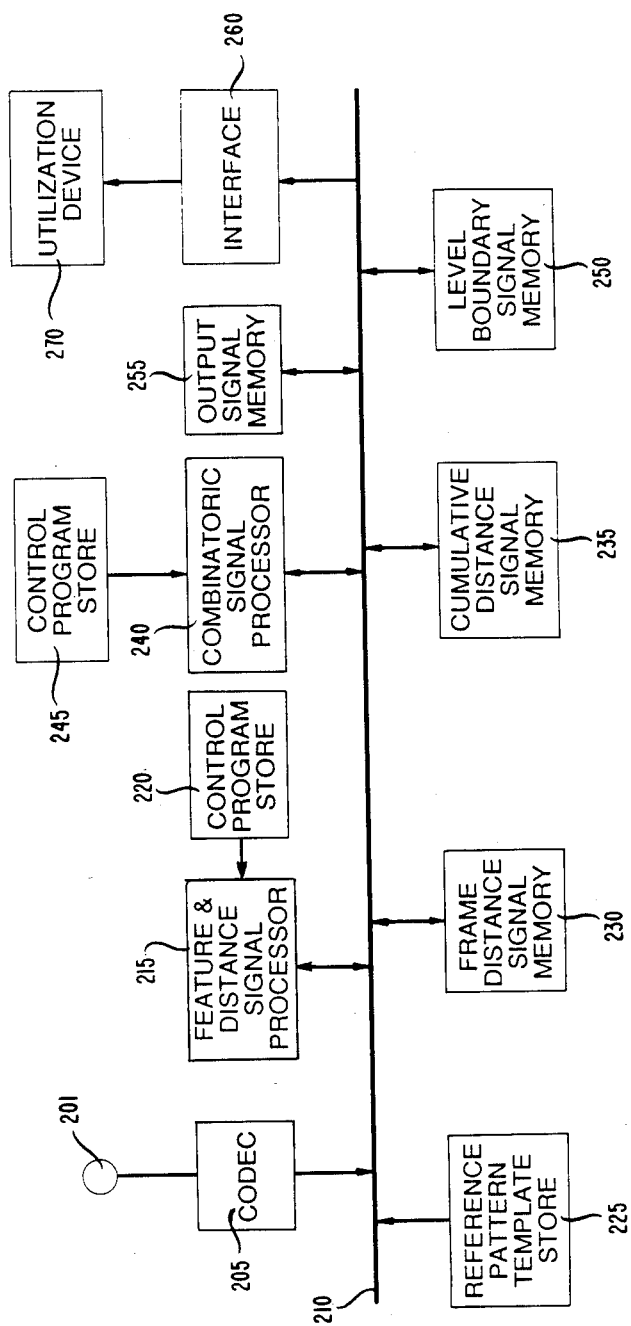
FIG. 2 is a general block diagram of a speech recognition arrangement illustrative of the invention.

The flow chart of FIG. 1 and the block diagram of FIG. 2 show a single pass multilevel speech recognition arrangement illustrative of the inVention. Referring to step 101 in FIG. 1, the recognizer arrangement of FIG. 2 is set to its initial state preparatory to receiving an unknown input utterance. Among the initialization operations, the input speech pattern frame index j is set to one and the reference pattern level index L is set to one. The frame index corresponds to the current time frame or 5 to 20 millisecond interval of the speech pattern for which acoustic feature signals, e.g., linear prediction coefficient signals, are generated. It is to be understood, however, that other well-known acoustic features may also be used. The recognizer circuit is operative to perform all reference pattern comparisons on a frame by frame basis so that only one pass through the speech pattern frames is needed to complete the recognition of the input utterance.

The level index L corresponds to the number of reference patterns, e.g., words, in the reference pattern strings that may match the input utterance. Each level is used to determine a time registration path through a single reference word of a string. Since the utterance may be a string of one or more reference words, a plurality of levels is required to determine the possible registration paths through the frame sequence of the unknown utterance.

The circuit of FIG. 2 includes feature and frame distance signal processor 215 operating under control of its associated control program store 220. Processor 215 may comprise the AT&T digital signal processor integrated circuit described in the *Bell System Technical Journal*, Vol. 60, No. 7, Part 2, September 1981, and its internal memory shown as control program store 220. The unknown speech pattern is converted into a sequence of digital coded signals in electroacoustic transducer 201 and codec 205 as is well known in the art. The digitally coded signals are supplied to processor 215 through bus 210.

The processor 215 analyzes the speech pattern signals and generates a set of acoustic feature signals responsive to the speech pattern signals of each successive frame thereof (step 105 in FIG. 1). The currently generated frame feature signals are stored in processor 215. The speech pattern frame rate is sufficiently low so that all recognition processing for the current frame is completed before the next frame feature signals are available. Consequently, each speech pattern frame is processed separately in the circuit of FIG. 2 and only one pass through the speech pattern frames is needed for recognition.

Figures 5, 8:
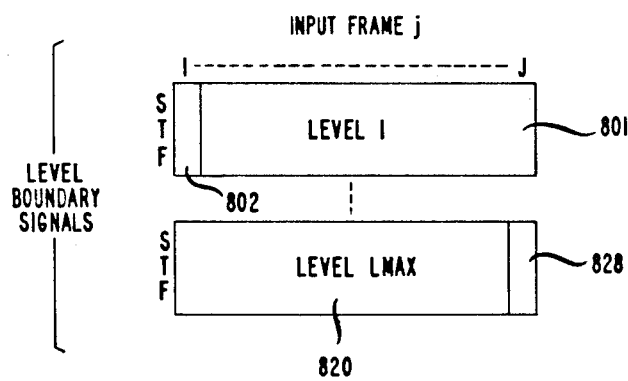
FIG. 5 illustrates the arrangement of the reference pattern memory of FIG. 2.
FIG. 8 illustrates the structure of the level boundary signal memory of FIG. 2.
Figure 6:
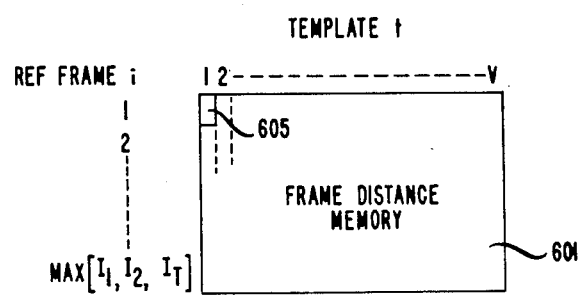
FIG. 6 illustrates the arrangement of the frame distance signal memory of FIG. 2.

The reference pattern acoustic feature signal sequences are stored in template store 225 of FIG. 2. These feature signals are arranged as shown in FIG. 5 together with a signal It indicating the number of feature signal frames so that each frame feature signal set $R^t(i)$ is addressed by reference word identification index t and frame reference frame index i. Frame distance signal store 230 shown in FIG. 6 is arranged in similar fashion whereby every frame signal d(t,i,j) for the current utterance frame index j is addressed by reference frame index i and reference word identification index t.

During step 110 of the recognition processing, a set of frame distance signals d(t,i,j) is formed for $1<=t<=V$ and $1<=i<=I$. Frame distance signal d(t,i,j) represents the similarity between the feature signals of the current input utterance frame feature signals and the feature signals of frame i of reference word t. Thus, first cell 605 in FIG. 6 contains the frame distance signal d(1,1,1) for reference template t=1, reference frame i=1 and the current utterance frame j=1.

As per step 115, these frame distance signals are combined with the frame distance signals generated during the preceding utterance frames to define time registration paths and cumulative distance signals for the paths in accordance with well-known dynamic time warping techniques. The time registration path signal is, in general, expressed as $$Lp(t,i,j,L) = Lp(t,i-a',j-1,L) \quad (8)$$

and the cumulative distance signal is $$s(t,i,j,L) = \min_a [s(t,i-a,j-1,L)] + d(t,i,j) \quad (9)$$

where $$a' = \mathrm{argmin}[s(t,i-a,j-1,L)] \text{ and } 0 \leq a \leq \min[2,i-1] \quad (10)$$

Figure 7:
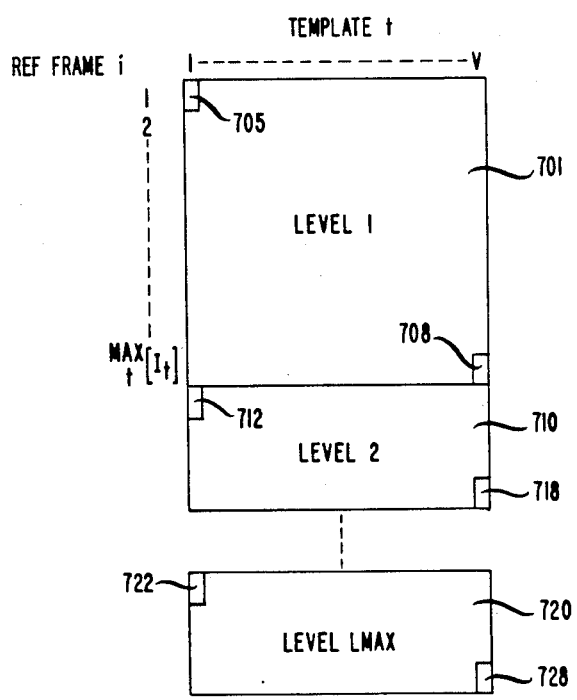
FIG. 7 illustrates the arrangement of the cumulative distance signal memory of FIG. 2.

The time registration signals Lp and the cumulative distance signals s are generated in combinatorics processor 240 and transferred therefrom to registration path-cumulative distance signal memory 235 shown in FIG. 7. Processor 240 may comprise the Intel type 80186 microprocessor device described in the book, *The 8086-8088 Primer*, 2nd Edition, by Stephen Morse, Hayden Book Company, Rochelle Park, N.J., 1980, and is operated under control of control program store 245.

Referring to FIG. 7, memory 235 is partitioned into levels. During the processing of each utterance frame j, the cumulative distance signals and registration paths for the templates are stored as addressed by reference word template number t and reference word frame i in the current level section. Level section 701 stores the cumulative distance and registration path signals for level 1 of the current utterance frame j. Similarly, level 2 registration and cumulative distance signals are stored in memory section 710 and level Lmax signals are stored in section 720. While utterance frame j=1, first cell 705 of level 1, section 701, contains the cumulative distance signals s(1,1,1,1) and Lp(1,1,1,1) for template t=1, reference frame i=1, and level L=1. Last cell 708 contains signals s(V,Iv,1,1) and Lp(V,Iv,1,1) corresponding to the last frame i=Iv of the last template t=V and level L=1. The signals in cells 712 and 718 are s(1,1,1,2), Lp(1,1,1,2), s(V,Iv,1,2), Lp(V,Iv,1,2), respectively. Cells 722 and 728 contain signals s(1,1,1,Lmax), Lp(1,1,1,Lmax), and s(V,Iv,1,Lmax), Lp(V,Iv,1,Lmax), respectively. Level L=1 stores the registration path and cumulative distances for the first word of the possible reference word strings for the current utterance frame j. Level L=2 stores the registration path and cumulative distance signals for the second word of possible reference word strings and level L=Lmax stores the last word registration path and cumulative distance signals of the possible reference word strings for the current utterance frame j.

If the ending frame (It) of a reference pattern is reached during the processing of the current utterance frame j, the corresponding registration path is at a reference word level boundary. For such registration paths, a set of level boundary signals are generated in step 120. These level boundary signals include a cumulative distance signal $$S(j,L) = s(t',It',j,L) \quad (11)$$

$$\text{where } t' = \mathrm{argmin}_t[s(t,It,j,L)] \quad (12)$$

a best reference pattern identification signal $$T(j,L) = \mathrm{argmin}_t[s(t,I(t),j,L)] \quad (13)$$

for the level registration path, and a backpointer signal $$F(j,L) = Lp(T(j,L),I(T(j,L)),j,L) \quad (14)$$

defining the previous level boundary frame for the registration path. The level boundary signals are formed in combinatoric signal processor 240 under control of its program store 245 and are placed in level boundary signal store 250. The arrangement of store 250 is illustrated in FIG. 8.

Referring to FIG. 8, memory 250 is divided into levels. Section 801 corresponds to the first reference word level 1 and section 820 corresponds to the last reference word level Lmax. Each level contains the boundary signals for the successive input utterance frames j=1,2, ..., J. The signals in cell 802 addressed by utterance frame j=1 and level L=1 are S(1,1), T(1,1) and F(1,1) while the signals in cell 828 for the last frame j=J and last level L=Lmax are S(J,Lmax), T(J,Lmax) and F(J,Lmax). These boundary level signals define the reference word strings found in the time registration operations of the recognizer arrangement.

Upon completion of the level boundary signal generation in step 120, the dynamic time warping registration paths and the registration path cumulative distance signals for utterance frame j are stored in the level L portion of the cumulative distance-registration path memory and level boundary signals up to the current utterance frame are stored in the level boundary signal memory. The level index L is then incremented as per step 125 and the time registration and cumulative distance signal formation for the next successive level as well as the level boundary processing is performed in the loop including steps 115, 120 and 125.

When the level index is incremented to the last level Lmax for the current utterance frame j, step 140 is entered via steps 130 and 135 and utterance frame index j is incremented. The recognition processing for the subsequent utterance frames is then iterated in the loop from step 105 to step 145 so that the entries in cumulative distance-registration path memory 235 and level boundary signal memory 250 are filled for each new frame over input utterance frame index j=1,2, ..., J. When recognition processing for the last utterance frame J is detected in step 145, a traceback through the reference word string boundary level signals T(j,L), S(j,L) and F(j,L) in level boundary signal memory 250 is performed as per step 150. The traceback, as is well known in the art, results in the identification of the reference word string having the lowest level boundary cumulative signal, i.e., whose feature signal sequence most closely corresponds to the feature signal sequence of the unknown utterance.

DETAILED DESCRIPTION

Figure 3:
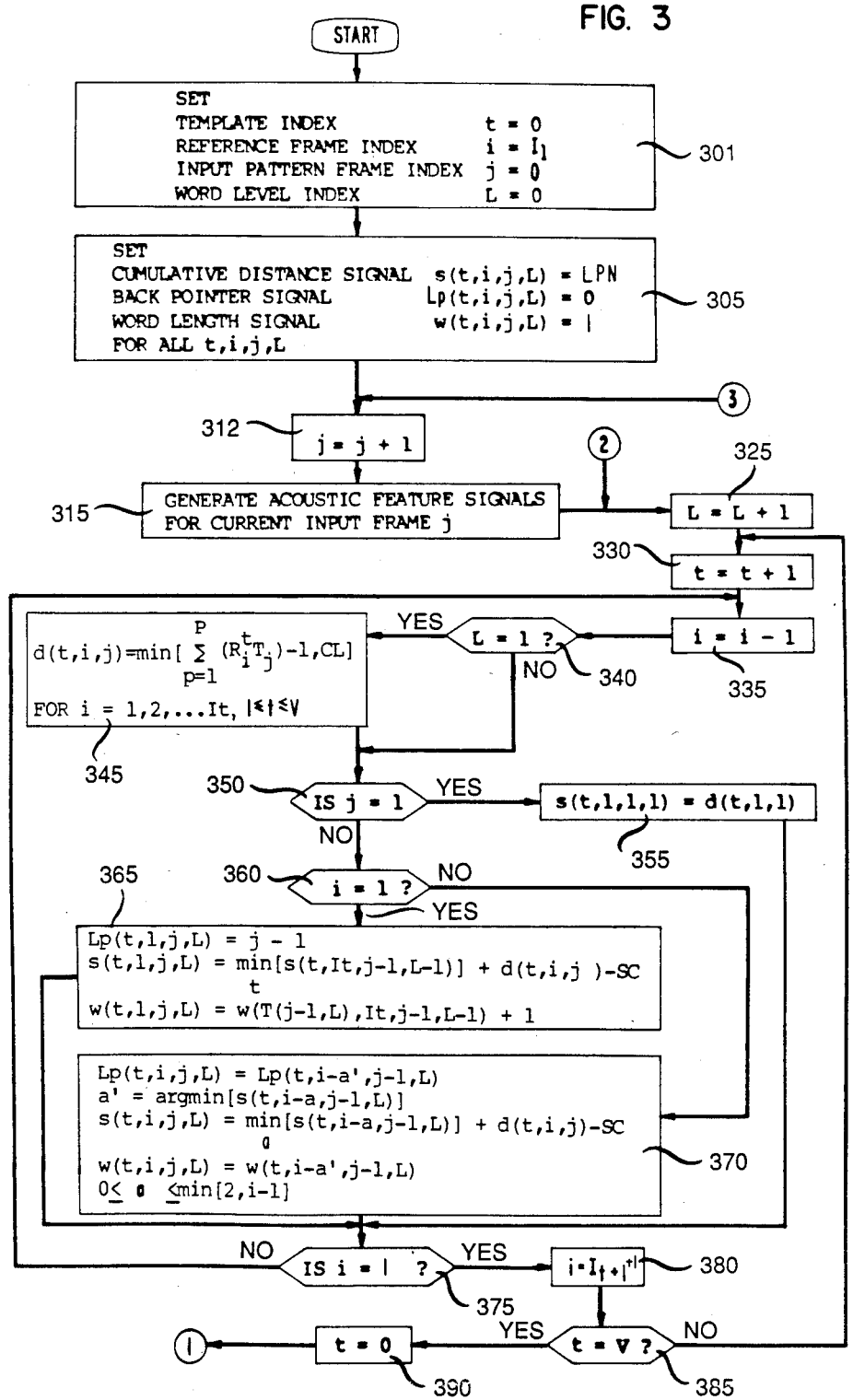
FIGS. 3 and 4 depict flow charts showing the speech recognition arrangement of FIG. 1 in greater detail.
Figure 4:
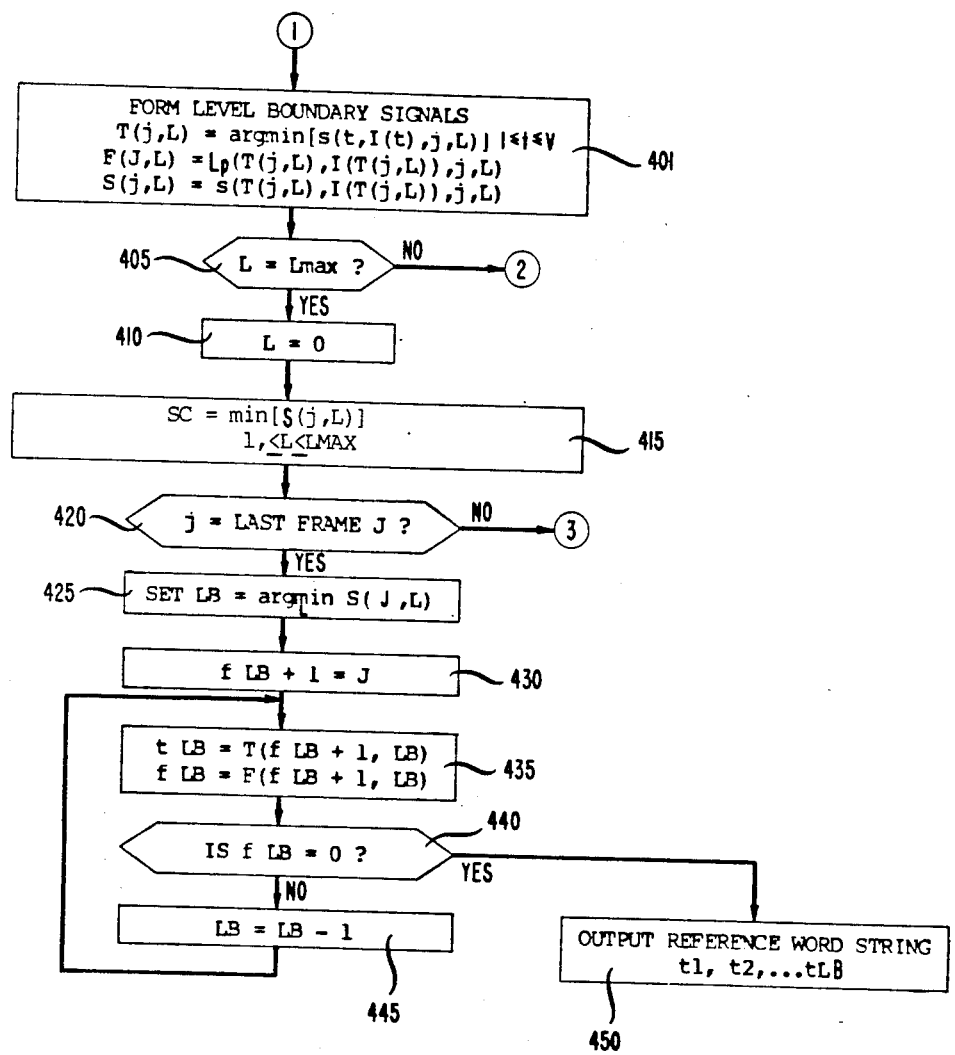

FIGS. 3 and 4 are detailed flow charts illustrating the operation of the circuit of FIG. 2 in recognizing an unknown utterance. For purposes of illustration, it is assumed that the reference templates in reference pattern template store 225 are feature signal sequences for the two spoken words "zero" and "one" so that the recognition arrangement is adapted to identify an input utterance as a string of binary digits.

Cumulative distance-registration path memory 235 is assumed to be a two word level store (Lmax=2) so that the input utterance may be recognized as the best matching one digit string or two digit string of "ones" and "zeros". Thus the possible reference word strings for the utterance are the single word "zero", the single word "one", the two word string "zero-one" and the two word string "one-zero". The two word level store permits dynamic time warp processing of all four possible reference pattern combinations without degrading the accuracy of recognition in a single pass through the input utterance frames. It is to be understood, however, that any number of reference pattern templates may be used to expand the recognizer vocabulary and that the number of levels may be increased to provide recognition of an input utterance comprising a longer string of words.

Referring to FIGS. 2 and 3, the utterance recognition process is started by initializing feature and frame distance signal processor 215 and combinatorics signal processor 240 of FIG. 2 in steps 301, 305 and 312 in FIG. 3. The permanently stored instructions of program control store 220 for processor 215 are listed in FORTRAN language form in Appendix A, and the permanently stored instructions of program control store 245 for processor 240 are listed in FORTRAN language form in Appendix B. Reference pattern template index t, input utterance frame index j and level index L are set to zero and reference frame index i is set to $I_1$ in processor 215 (step 301). Cumulative distance signal s(t,i,j,L) is set to the largest possible number (1pn) that may be processed and stored. Registration path signals Lp(t,i,j,L) and word length signals w(t,i,j,L) for all t,i,L index values of cumulative distance-registration path memory 235 are initialized in step 305.

After step 305, utterance frame index j is incremented to one (step 312) and processor 215 converts the currently received utterance signals from codec 205 into LPC feature vector signals (step 315). These feature signals are assigned to the current frame index j=1 and temporarily stored. Reference template index t, reference frame index i and level index L are incremented by one in steps 325, 330 and 335. Since L=1, the local frame distance signals d(t,i,j) are generated for all frames i=1,2, ..., I1 of reference word template 1, and the current utterance frame j according to the well-known distance formulation of step 345. The frame distance signals are produced in feature and distance signal processor 215 which receives the reference template feature signals from reference pattern template store 225 over bus 210. These distance signals are stored in frame distance signal memory 230. The frame distance signals correspond to the similarity of the reference template frame feature signals from store 225 to the feature signals of utterance frame j. These frame distance signals are the same for all word levels and need only be generated once responsive to level signal L being one in decision step 340.

While frame distance signals generally have a large range of values, such values are truncated in this illustrative example for purposes of simplification. It is to be understood, however, that such truncation is done for purposes of illustration only and that the invention may be implemented with untruncated frame distance values and the truncation described herein does not limit the scope of the invention. Thus, the frame distance signal d(t,i,j)=0 if there is a good match between the reference frame feature signals and the utterance frame feature signals, and d(t,i,j)=1 if there is a poor match between the frame reference and utterance feature signals.

For the exemplary binary digit utterance, it is assumed that each of the reference templates "zero" and "one" has three frames and the input utterance is the two word phrase "one-zero" of 7 frame duration. Table 1 lists the frame distance signals generated in processor 215 for reference template t1 ("zero") and Table 2 lists the frame distance signals generated for reference template t2 ("one").

TABLE 2

Frame Distance Signals for Reference Template $t_2$ ("one")
Reference t = 2 "one"

| Reference Frame i | Input Frame j | | | | | | |
|---|---|---|---|---|---|---|---|
| | 1 | 2 | 3 | 4 | 5 | 6 | 7 |
| 1 | 0 | 1 | 1 | 1 | 1 | 1 | 1 |
| 2 | 1 | 0 | 1 | 1 | 1 | 1 | 1 |
| 3 | 1 | 1 | 0 | 1 | 1 | 1 | 1 |

TABLE 1

Frame Distance Signals for
Reference Template t₁ ("zero")
Reference t = 1 "zero"

| Reference Frame i | Input Frame j | | | | | | |
|---|---|---|---|---|---|---|---|
| | 1 | 2 | 3 | 4 | 5 | 6 | 7 |
| 1 | 1 | 1 | 1 | 0 | 1 | 1 | 1 |
| 2 | 1 | 1 | 1 | 1 | 0 | 1 | 1 |
| 3 | 1 | 1 | 1 | 1 | 1 | 0 | 1 |

These frame distance signals are produced according to step 345 on a frame by frame basis. When utterance frame index j is one and reference template index is one, memory 230 receives the distance signals 1,1,1 for reference template t1 frames 1, 2, and 3. For utterance frame j=1 and frames 1, 2, and 3 of reference pattern t2, the distance signal sequence 0,1,1 is formed in processor 215 and stored in frame distance signal memory 230.

Utterance index j is then tested in decision step 350. If j is the first utterance frame, the first reference frame cumulative distance signal s(t,1,1,1) is assigned the value of frame distance signal d(t,1,1) in processor 240 (step 355). From Table 1, s(1,1,1,1) is set to one when reference template index t is one and s(2,1,1,1) is set to zero for reference template index 2 when utterance index j=1. The other cumulative distance signal and time registration path signal values for utterance frame j=1 were set during initialization step 305 and control is passed to step 375.

For j>1 and any value of level index L, the reference template frame index i is tested in decision step 360. In the event i=1, the initial frame level registration path and cumulative distance processing (step 365) are entered. Otherwise, step 370 is performed. Step 365 is used whenever a reference word level boundary has been passed. In the cumulative signal and registration path signal formation just after the level boundary frame, the lowest cumulative distance at the boundary frame for the preceding utterance frame (j−1) is chosen and the word count signal for the lowest cumulative distance path is incremented and stored for the i=1 reference frame as indicated in step 365.

The cumulative distance and registration path signals for the exemplary utterance are illustrated in Table 3.

The first entry in the table addressed by t=1, i=1 and L=1 is 1,1,0 representing a frame distance signal d(1,1,1)=1, a cumulative distance signal s(1,1,1,1)=1 and a backpointer signal Lp(1,1,1,1)=0 and the entry for utterance frame j=5 addressed by t=2, i=3, L=2 is 1,2,3 is the frame distance signal d(2,3,5)=1, cumulative distance signal s(2,3,5,2)=2, and backpointer signal Lp(2,3,5,2)=3.

Subsequent to registration path and cumulative distance signal processing in processor 240 as per step 365 or 370 for the current t,i,j, and L index signal values, a decision is made as to whether the current reference frame is the reference beginning frame i=1 (step 375). Until begin frame 1 process is completed, the loop from step 335 to step 375 is iterated over the reference pattern frames i=It, It−1, ..., 2,1 for the current reference template t so that registration path signals Lp(t,i,j,L), cumulative distance signals s(t,i,j,L) and word count signals w(t,i,j,L) are produced and stored in memory 235 for the current values of reference template index signal t, level index signal L and input utterance frame index j.

When reference frame index i=1 in step 375, it is reset to $I_{t+1}+1$ (step 380) and reference template index t is checked to determine whether the last reference template processing for utterance frame j and level L (step 385) has been completed. For t not equal to V, control is passed from decision step 385 to step 330, and the processing of the next reference template is performed in the loop from step 330 to step 385. In this manner, the distance and time registration path for the frames of the reference templates and the current utterance frame j are produced in processor 240 and stored in memory 235.

Step 401 of FIG. 4 is entered via reference template index reset step 390 upon termination of the current utterance frame cumulative distance and registration signal formation and the level boundary signals T(j,L), F(j,L) and S(j,L) are formed in processor 240 for the reference word endframes It occurring in the current utterance frame j. These level boundary signals are placed in store 250. For the exemplary utterance, after the cumulative distance and time registration signal processing of the last frame I2 of the last reference

TABLE 3

| Level L | Reference Index t | Reference Frame i | Input Frame j | | | | | | |
|---|---|---|---|---|---|---|---|---|---|
| | | | 1 | 2 | 3 | 4 | 5 | 6 | 7 |
| L = 1 | t = "zero" | 1 | 1,1,0 | 1,LPN,0 | 1,LPN,0 | 0,LPN,0 | 1,LPN,0 | 1,LPN,0 | 1,LPN,0 |
| | | 2 | 1,LPN,0 | 1,2,0 | 1,3,0 | 1,4,0 | 0,4,0 | 1,5,0 | 1,6,0 |
| | | 3 | 1,LPN,0 | 1,2,0 | 1,3,0 | 1,4,0 | 1,5,0 | 0,4,0 | 1,5,0 |
| | t = 2 "one" | 1 | 0,0,0 | 1,LPN,0 | 1,LPN,0 | 1,LPN,0 | 1,LPN,0 | 1,LPN,0 | 1,LPN,0 |
| | | 2 | 1,LPN,0 | 0,0,0 | 1,1,0 | 1,2,0 | 1,3,0 | 1,4,0 | 1,5,0 |
| | | 3 | 1,LPN,0 | 1,1,0 | 0,0,0 | 1,1,0 | 1,2,0 | 1,3,0 | 1,4,0 |
| L = 2 | t = 1 "zero" | 1 | 1,LPN,0 | 1,LPN,0 | 1,2,2 | 0,0,3 | 1,2,4 | 1,3,5 | 1,4,6 |
| | | 2 | 1,LPN,0 | 1,LPN,0 | 1,LPN,0 | 1,3,2 | 0,0,3 | 1,1,3 | 1,2,3 |
| | | 3 | 1,LPN,0 | 1,LPN,0 | 1,LPN,0 | 1,3,2 | 1,1,3 | 0,0,3 | 1,1,3 |
| | t = 2 "one" | 1 | 0,LPN,0 | 1,LPN,0 | 1,2,2 | 1,1,3 | 1,2,4 | 1,3,5 | 1,4,6 |
| | | 2 | 1,LPN,0 | 0,LPN,0 | 1,LPN,0 | 1,3,2 | 1,2,3 | 1,3,4 | 1,4,5 |
| | | 3 | 1,LPN,0 | 1,LPN,0 | 0,LPN,0 | 1,3,2 | 1,2,3 | 1,3,3 | 1,4,4 |

Each row in the table illustrates how the cells of memory 235 change as utterance frame index j is incremented. Each cell of memory 235 is addressed by reference template index t, reference frame index i, and level index L as indicated in steps 365 and 370 and the cells of Table 3 have the values of the frame distance signal d, the cumulative distance signal s and the registration path signal for utterance frame j=1 Lp in that order.

pattern (template t=2) in step 370 and input utterance frame j=3, the boundary frame distance and backpointer signals for level L=1 are s(1,3,3,1)=30, Lp(1,3,3,1)=0 for reference word "zero" and s(2,3,3,1)=0, Lp(2,3,3,1)=0 for reference word "one".

In step 401, the reference template having the minimum cumulative distance at the level boundary is selected as best reference T, the cumulative distance signal for the best reference T is selected as the boundary cumulative distance signal S for the current frame and level and the backpointer signal for the boundary frame of the best reference T is selected as the boundary backpointer signal F(j,L). For the exemplary utterance, the level boundary frame signals are listed in Table 4.

TABLE 4

| Level | Level Boundary Signal | Input Frame j |   |   |   |   |   |   |
|---|---|---|---|---|---|---|---|---|
|   |   | 1 | 2 | 3 | 4 | 5 | 6 | 7 |
| L = 1 | S | LPN | 1 | 0 | 1 | 2 | 3 | 4 |
|   | T | 2 | 2 | 2 | 2 | 2 | 2 | 2 |
|   | F | 0 | 0 | 0 | 0 | 0 | 0 | 0 |
| L = 2 | S | LPN | LPN | LPN | 3 | 1 | 0 | 1 |
|   | T | 2 | 2 | 2 | 2 | 1 | 1 | 1 |
|   | F | 0 | 0 | 0 | 2 | 3 | 3 | 3 |

As applied to level L=1 of utterance frame j=3, the best template T(3,1)=2, the boundary frame distance S(3,1)=0 the backpointer F(3,1)=0. Thus, the best reference word for the first word level of the string is "one".

Until the last level Lmax processing has been completed, step 325 is reentered so that the next word level registration path and level boundary signal processing are performed for the current utterance frame j as aforementioned. When the last word level for the current utterance frame j is reached in step 405, The level index L is reset to zero (step 410), a scale factor signal SC=min [s(j,L)] is generated as per step 415 to maintain the cumulative distance signals of steps 365 and 370 within the range of values acceptable by processor 225 and store 235. The utterance frame index j is then compared to the utterance endframe J (step 420). Rescaling using the SC signal of step 415 is not essential but prevents the cumulative distance signal values from exceeding the data length capacity of memory 235 or processor 240.

In accordance with the invention, the utterance feature signals are supplied to the circuit of FIG. 2 one frame at a time. All registration path and cumulative distance signals are formed for the present frame and the level boundary signals are generated for the current frame. In this way, the utterance recognition may be completed rapidly in a "real time" pass through the utterance while accuracy is assured by considering all possible single and multiple word sequences.

For purposes of illustration, consider the exemplary input utterance of 7 time frame duration and reference patterns for "zero" and "one" each having 3 time frames and one frame of "noise". Each entry in Table 3, shows the frame distance signal d(t,i,j), the cumulative distance signal s(t,i,j,L), and the back frame pointer signal Lp(t,i,j,L) arranged according to input frame indices j and reference frame indices i of the reference templates. During the first utterance frame processing, the distance signals for j=1 obtained in step 345 of FIG. 3 are shown in Table 1 for reference template t1 (zero) ane Table 2 for reference template t2 (one). The cumulative distance signals s(1,1,1,1) and s(2,1,1,1) are set to d(1,1,1)=1 and d(2,1,1)=0, respectively, in step 355. The remainder of the cumulative distance signal entries for the frame j=1 column in Table 3 were previously initialized to the largest possible number lpn in step 305. Level boundary signals are listed in Table 4. For frame j=1, the frame cumulative distances s(1,3,1,1), s(2,3,1,1), s(1,3,1,2) and s(2,3,1,2) shown in Table 3 are all equal to lpn and the backpointers for these entries are to the initial frame 0. As shown in Table 4, the boundary cumulative distance signals S(1,1) and S(1,2) are both lpn, the selected reference template for both levels is template t=2 since the last of equal distance signals is selected in the event of equal values. The backpointer signals F(1,1) and F(1,2) are zero. These values are generated in step 401 of FIG. 4.

In the second input utterance frame processing (j=2), the cumulative distance and backpointer frame signals indicated in the j=2 column of Table 3 are obtained. The first reference word frame signals are generated in step 365 and the other reference word frame signals are produced in step 370. The entry for level L=1, t=1, i=2 and j=2 in the table correspond to the frame distance d(1,2,2)=1 of Table 1, cumulative distance signal s(1,2,2,1)=2, and backpointer signal Lp(1,2,2,1)=0. The cumulative distance and backpointer signals are generated in step 370. When boundary signal generating step 401 is reached, the boundary cumulative distance signals are evaluated and the minimum is chosen. The first level minimum boundary cumulative distance signal S(2,1) is 1 for boundary reference T(2,1)=2 and the boundary backpointer signal is F(2,1)=0 as shown in Table 4. The corresponding level 2 signals are S(2,2)=1 pn, T(2,2)=2 and F(2,2)=0. The feature signal processing is continued in accordance with the flow charts of FIGS. 3 and 4 until the time registration and cumulative distance signals and level boundary signals shown in Tables 3 and 4 are obtained for the successive input utterance frames. These signals are generated in accordance with the well-known dynamic time warping constraints of steps 365 and 370 in one pass through the input utterance time frames taking into account strings of one or two reference words in length through the two level processing.

After the feature signals for the ending frame j=J of the utterance are processed, the level boundary signals for all utterance frames are stored in memory 250. At this point in the operation of the circuit of FIG. 2, the registration paths for the reference word strings are stored and the selection of the closest matching reference string is started in step 425 via decision step 420. The reference word sequence selection is accomplished by backtracking through the registration path entries of level boundary signal memory 250. In step 425, the level L corresponding to the minimum boundary level cumulative distance signal S(J,L) of the last frame is selected in processor 240 as signal LB. Signals $t_{LB}$ and $f_{LB}$ for the template T(J,LB) and the backtrack frame F(J,LB) entries are produced in step 435 and stored in output signal memory 255 of FIG. 2. The initial fLB signal corresponding to the utterance frame J is set in step 430 prior to entering the loop from step 435 to step 445. If the backtrack frame signal $f_{LB}=0$ is not detected (step 440), backtrack level signal LB is decremented by one (step 445). The best template $T_{LB-1}$ at backtrack frame location $f_{LB}$ is selected as well as its corresponding backtrack frame $f_{LB-1}$. The backtracking loop from step 435 through 445 is iterated until the beginning frame 0 is detected in decision step 440. The best matching reference word string t1,t2, . . . tLB stored in memory 255 is then transferred to utilization device 270 via bus 210 interface 260 in step 450.

With respect to the exemplary input utterance, the boundary level signal values shown in Table 4 are used to obtain the best matching reference word string. Referring to Table 4, the best cumulative distance signal in the last utterance frame j=7 is S(7,2)=1 and the best reference word T(7,2) for this frame is "one". The backpointer signal F(7,2) is 3 so that the frame j=3 entries of table are addressed to determine the preceding reference word in the best matching string. In the frame j=3 column of Table 4, the minimum boundary cumulative distance signal is S(3,1)=0, the corresponding reference word is "zero" and the backpointer F(3,1) is 0. Upon detection of F(3)=0, the code for the best matching reference string t2,t1 is transferred to utilization device 270 of FIG. 2 as per step 450 of FIG. 4.

The number of reference word levels L is selected to accomodate the longest expected reference word string for the input utterance. If, however, the number of levels is not sufficient, the recognition arrangement of FIG. 2 can be modified to provide for utterance identification by incorporating a word length signal for each steps 365 and 370 of FIG. 3 where the w(t,i,j,L) signal corresponding to number of words in each registration path is formed. The w(t,i,j,L) signals may be stored in cumulative distance-registration path memory 235. For a reference word string longer than two words in the exemplary utterance, the registration path reenters the first level after traversing the level Lmax=2. Since the word length signal is retained for the registrations paths, the reference word string may be identified in the traceback operations shown in the flow chart of FIG. 4.

The invention has been shown and described with reference to one embodiment thereof. It is to be understood, however, that various modifications may be made by those skilled in the art without departing from the spirit and scope of the invention.

Appendix A - Feature Signal and Frame Distance Control

```
      c       generates autocorrelation of speech
              subroutine autocorrelation(speech,r)
              parameter (iflen=300)   ! length of frame in
 5            samples
              parameter (ir=9)   ! number of autocorrelation
              coefficients
              real speech(iflen)
              real window(iflen)
10            real dat(iflen)
              real r(ir)
      c       open files
      c       generate hamming window
              pi=3.14159265359
15            do 300 in1=1,iflen
              window(in1)=.54-(.46)*cos(2.0*pi*(float(in1)-1.0)
              /float(iflen-1))
      300     continue
      c       calculate dc offset
20            offset=0.
              do 20 in1=1,iflen
              offset=offset+speech(in1)
      20      continue
              offset=offset/iflen
25    c       remove dc offset
              do 30 in1=1,idata
      30      speech(in1)=speech(in1)-offset
      c       preemphasis
              do 40 in1=iflen,2,-1
30            speech(in1)=speech(in1)-(15./16.)*speech(in1-1)
      40      speech(in1)=speech(in1)
      c       frame and window
              do 11 in1=1,iflen
              dat(in1)=speech(in1)
35            dat(in1)=dat(in1)*window(in1)
      11      continue
      c       autocorrelation
              do 3 in1=1,9
              iend=301-in1
40            r(in1)=0.0
              do 4 in2=1,iend
              r(in1)=r(in1)+dat(in2)*dat(in2+in1-1)
      4       continue
      3       continue
45            return
              end
      c       dist computes distance score
              subroutine dist(cr,ct,dst)
              dimension cr(9),ct(9)
```

```
            m=8
            me=m+1
            clip=2.0
            prl=0.0
            do 10 i=2,m
    10      prl=prl+cr(i)*ct(i)
            prl=prl+1.0
            if(prl.lt.1.E-5) prl=1.E-5
            dst=amin1((prl*cr(1)-1.0),clip)
            return
            end
    c       ctest converts autocorrelation to test vector
            subroutine ctest(ct,me)
            dimension ct(me)
            m=me-1
            do 1 j=1,m
    1       ct(j+1)=ct(j+1)/ct(1)
            ct(1)=1
            return
            end
```

Appendix B - Combinatorics Processor Control

```
    c       single pass level building algorithm.
    c       program splb .
    c
    c       initialize
    c
            t=0
            i=I(1)
            j=0
            L=0
    c
            do 1 L=1,Lmax
                do 2 t=1,V
                    do 3 i=1,I(t)
                        s(t,i,L)=LPN
                        Lp(t,i,L)=0
                        w(t,i,L)=1
    3               continue
    2           continue
    1       continue
    c
    1000    continue
            j=j+1
            call signal processor to generate acoustic
            feature signals for frame j
    c
    2000    continue
            L=L+1
    c
    3000    continue
            t=t+1
    c
    4000    continue
            i=i-1
    c
            if(L.eq.1)then
                call signal processor to compute d(t,i)
            endif
    c
            if(j.eq.1)then
                s(t,1,1)=d(t,1)
            else
                if(i.eq.1)then
                    Lp(t,1,L)=j-1
```

```
            s(t,1,L)=S(j-1,L-1)+d(t,i)-scale
            w(t,1,L)=w(T(j-1,L-1),I(T(j-1,L-1)),L-1)+1
         else
            a'=argmin[s(t,i-a,L-1)]   0<=a<=min[2,i-1]
            Lp(t,i,L)=Lp(t,i-a',L)
            s(t,i,L)=s(t,i-a',L)+d(t,i)-scale
            w(t,i,L)=w(t,i-a',L)
         endif
      endif
c
      if(i.ne.1) go to 4000
      i=I(t+1)
      if(t.ne.V) go to 3000
      t=0
c     .
c     form boundary level signals
      T(j,L)=argmin[s(t,I(t),L)]   1<=t<=V
      F(j,L)=1(T(j,L),I(T(j,L)),L)
      S(j,L)=s(T(j,L),I(T(j,L)),L)
c
      if(L.ne.Lmax) go to 2000
      L=0
c
c     determine rescale value
      scale=min[S(j,L)]   1<=L<=Lmax
c
      if(j.ne.J) go to 1000
c
c     traceback
c
      LB=argmin[S(J,L)]   1<=L<=Lmax
      f(LB+1)=J
5000  continue
      t(LB)=T(f(LB+1),LB)
      f(LB)=F(f(LB+1),LB)
      if(f(LB).eq.0)then
         write t(1),t(2),...t(LB)
         stop
      else
         LB=LB-1
         go to 5000
      endif
```

What is claimed is:

1. In a speech analyzer having a set of stored reference pattern templates t=1,2,...,V each comprising a time frame sequence i=1,2,..., It of acoustic feature signals including an end frame i=It representative of an identified reference pattern, a method for recognizing an unknown utterance as a string of reference patterns e.g. t1,t2,...,t3 comprising the steps of:

producing signals representative of the time frame sequence j=1,2...,J of acoustic features of the utterance responsive to the acoustic pattern of the utterance;

generating at least one reference pattern string e.g. t1,t2,...,t3 responsive to the acoustic feature signals of the time frame sequence j=1,2,...,J of the utterance and the acoustic feature signals of the time frame sequence i=1,2,...,It of the reference patterns t=1,2,...,V; and identifying the utterance as one of said reference pattern strings e.g. t1,t2,...,t3;

wherein the step of producing signals representative of the time frame sequence j=1,2,...,J of acoustic features of the utterance comprises receiving the currently occurring time frame portion of the utterance;

generating a signal j identifying the time frame in which the current portion of the utterance occurs in the succession of utterance time frames j=1,2,...,J responsive to the currently occurring portion of the utterance; and producing a signal representative of the acoustic features of jth frame portion of the utterance responsive to the received currently occurring time frame portion of the utterance;

said step of generating at least one reference pattern string e.g. t1,t2,...,t3 responsive to the acoustic feature signals of the time frame sequence of the utterance and acoustic feature signals of the time frame sequence i=1,2,...,Iv of the reference patterns comprises;

responsive to the producing of the acoustic feature signals of the currently occurring portion of the utterance in the current time frame j, performing the following steps (a) producing a set of signals identifying levels L=1,2,...,LMAX, each level corresponding to the position of a reference pattern in the at least one reference pattern string;

(b) time registering the acoustic feature signals of the current time frame j portion of the utterance with the acoustic feature signals of the time frames i=1,2, . . . ,It of each reference pattern for each level L=1,2, . . . ,LMAX responsive to the acoustic feature signals of the current time frame portion of the utterance and the acoustic feature signals of the time frame portions of the reference patterns; and (c) producing a set of cumulative correspondence signals for the time registration path ending time frames It of the reference patterns at levels L=1,2, . . . LMAX for the currently occurring time frame j portion of the utterance; and the step of identifying the utterance as one of said reference pattern strings e.g. t1,t2, . . . ,t3 comprises generating signals representative of reference pattern strings after the formation of the time registration path and time registration path correspondence signals of the levels for the last utterance time frame J responsive to the time registration path and time registration path cumulative correspondence signals for the reference pattern ending time frames It of levels L=1,2, . . . ,LMAX of the utterance portion time frames j=1,2, . . . J.

2. In a speech analyzer having a set of stored reference pattern templates t=1,2, . . . V each comprising a time frame sequence i=1,2, . . . .IR of acoustic feature signals including an end frame i=It representative of an identified reference pattern, a method for recognizing an unknown utterance as a string of reference patterns e.g. t1,t2, . . . t3 according to claim 1 wherein said time registering step comprises:

generating a set of signals representative of the correspondence between the acoustic feature signals of the currently occurring time frame j portion of the utterance and the acoustic feature signals of the time frames i=1,2, . . . ,It of each reference pattern; and producing a set of signals representative of the time registration path between the acoustic feature signals of the time frames i=1,2, . . . ,It of each reference pattern and the acoustic feature signals of the currently occurring time frame j portion and the preceding time frame portions of the uttterance j=j−1,j−2, . . . ,1 responsive to the correspondence signals generated for the the currently occurring time frame j portion of the utterance and the correspondence signals generated for the preceding utterance time frame portions j=j−1, j−2, . . . ,1.

3. In a speech analyzer having a set of stored reference pattern templates t=1,2, . . . V each comprising a time frame sequence i=1,2, . . . It of acoustic feature signals including an end frame i=It representative of an identified reference pattern, a method for recognizing an unknown utterance as a string of reference patterns e.g. t1,t2, . . . t3 according to claim 2 wherein the step of producing a set of cumulative correspondence signals for the time registration path ending time frames It of the reference patterns at levels L=1,2, . . . LMAX for the currently occurring time frames j portion of the utterance comprises generating cumulative correspondence signals between the acoustic feature signals of the currently occurring time frame j portion of the utterance and the acouostic feature signals of the time frame i portions of the reference patterns in the order of reference frame time portions from i=It,It−I,It−2, . . . ,1.

4. In a speech analyzer having a set of stored reference pattern templates t=1,2, . . . V each comprising a time frame sequence i=1,2, . . . It of acoustic feature signals including an end frame i=It representative of an identified reference pattern, a method for recognizing an unknown utterance as a string of reference patterns e.g. t1,t2, . . . t3 according to claim 1, 2, or 3 wherein said reference patterns are reference word patterns.

5. In a speech analyzer having a set of stored reference pattern templates t=1,2, . . . V each comprising a time frame sequence i=1,2, . . . It of acoustic feature signals including an end frame i=It representative of an identified reference pattern, a method for recognizing an unknown utterance as a string of reference patterns e.g. t1,t2, . . . t3 according to claim 1, 2, or 3 wherein said acoustic feature signals are predictive feature signals.

6. In a speech analyzer having a set of stored reference word templates t=1,2, . . . V each comprising a time frame sequence i=1,2, . . . It extending to a word ending boundary frame i=It of acoustic feature signals representative of an identified reference word, a method for recognizing an input speech pattern as a string of predetermined reference words e.g. t1,t2 . . . t3 comprising the steps of:

producing signals representative of the acoustic features of the successive time frames j=1,2, . . . J of the input speech pattern;

generating at least one string e.g. t1,t2, . . . t3 of the identified reference words responsive to the acoustic feature signals of the time frame sequence j=1,2, . . . J of the input speech pattern and the time frame sequence i=1,2, . . . It of acoustic feature signals of the reference words t=1,2, . . . V; and identifying the input speech pattern as one of said reference word strings e.g. t1,t2, . . . t3;

wherein the step of producing the signals representative of the acoustic features of successive time frames of the input speech pattern comprises receiving the currently occurring time frame portion of the input speech pattern;

generating a signal identifying the time frame j corresponding to the currently occurring portion of the input speech pattern; and forming a signal representative of the acoustic features of the currently occurring jth time frame portion of the speech pattern responsive to the currently occurring portion of the input speech pattern; and the step of generating at least one reference word string e.g. t1,t2, . . . t3 responsive to acoustic feature signals of the time frames j=1,2, . . . J of the speech pattern and the acoustic feature signals of time frames i=1,2, . . . It of reference words t=1,2, . . . ,V comprises:

for the currently occurring speech pattern portion time frame j in the succession of speech pattern time frame portions j=1,2, . . . J producing a set of signals identifying a plurality of reference word levels L=1,2, . . . LMAX for the currently occurring speech pattern time frame portion j; and for each identified level signal L=1,2, . . ,LMAX in the currently occurring speech pattern time frame portion j performing steps a, b, c and d (a) forming a signal d(t,i,j) representative of the distance between the acoustic features of the currently occurring speech pattern time frame portion j and the acoustic features of each reference word time frame i=1,2, . . . ,It responsive to the acoustic feature signals of the currently occurring speech pattern time frame portion j and the acoustic feature signals of the reference word time frames i=1,2, . . . ,It, (b) forming a signal Lp(t,i,j,L) representative of the time registration path of the speech pattern and each reference word pattern distance signals d(t,i,j) formed for the currently occurring speech pattern time frame portion j and the distance signals for the preceding time frame portions j=j−1,j−2, . . . ,1 of the speech pattern;

(c) forming a signal s(t,i,j,L) representative of the cumulative distance between the speech pattern acoustic features and the reference word features along the time registration paths Lp(t,i,j,L) up to the currently occurring speech time frame j responsive to the distance signals d(t,i,j) of the currently occurring speech pattern time frame j and the j=j−1,j−2 . . .1 preceding time frames of the speech pattern; and (d) for the word ending boundary frame (It) of each reference word, generating signals T(j,L), F(j,L) identifying reference word strings and signals S(j,L) representative of the cumulative distance between the identified reference word strings and the speech pattern responsive to the time registration path and cumulative distance signals of the word level; and the step of identifying the speech pattern as one of said reference word strings comprises, after the last speech pattern time frame J, selecting the best matching reference word string responsive to the cumulative distance signals S(j,L) of the identified reference word strings.

* * * * *